US009170082B2

(12) United States Patent
Moreau et al.

(10) Patent No.: US 9,170,082 B2
(45) Date of Patent: Oct. 27, 2015

(54) TAPE MEASURE HOLDER

(71) Applicant: Ty-Flot, Inc., Manchester, NH (US)

(72) Inventors: Darrell A. Moreau, Manchester, NH (US); Andre W. Moreau, Spring Hill, FL (US); Barbara Haberman, Goffstown, NH (US)

(73) Assignee: Ty-Flot, Inc., Manchester, NH (US)

( * ) Notice: Subject to any disclaimer, the term of this patent is extended or adjusted under 35 U.S.C. 154(b) by 186 days.

(21) Appl. No.: 13/946,323

(22) Filed: Jul. 19, 2013

(65) Prior Publication Data

US 2014/0310969 A1    Oct. 23, 2014

Related U.S. Application Data

(63) Continuation-in-part of application No. 29/452,484, filed on Apr. 17, 2013, now Pat. No. Des. 711,753.

(51) Int. Cl.
G01B 3/10 (2006.01)
(52) U.S. Cl.
CPC ...... G01B 3/1041 (2013.01); *G01B 2003/1048* (2013.01)
(58) Field of Classification Search
CPC .............. G01B 3/10; G01B 3/1084; G01B 2003/1089; G01B 3/1041; G01B 3/1071
USPC ............................. 33/759, 760, 768, 769, 770
See application file for complete search history.

(56) References Cited

U.S. PATENT DOCUMENTS

| 2,807,886 | A | * | 10/1957 | Aciego | 33/668 |
|---|---|---|---|---|---|
| 4,874,255 | A | * | 10/1989 | Ball et al. | 383/8 |
| 5,025,966 | A | * | 6/1991 | Potter | 224/183 |
| 5,100,037 | A | * | 3/1992 | Kopyta et al. | 224/245 |
| D334,286 | S | * | 3/1993 | Keene | D3/228 |
| 5,257,729 | A | * | 11/1993 | Silvernail | 224/219 |
| 5,388,741 | A | * | 2/1995 | Hillinger | 224/679 |
| 5,577,329 | A | * | 11/1996 | States | 33/768 |
| 5,809,662 | A | * | 9/1998 | Skinner | 33/768 |
| 5,915,610 | A | * | 6/1999 | Russell | 224/673 |
| 6,047,481 | A | * | 4/2000 | Bond | 33/768 |
| 6,098,303 | A | * | 8/2000 | Vogel | 33/770 |
| 6,212,788 | B1 | * | 4/2001 | Zerkle | 33/767 |
| 6,457,252 | B1 | * | 10/2002 | Kershner | 33/760 |
| D711,753 | S | * | 8/2014 | Moreau et al. | D10/74 |
| 2003/0074803 | A1 | * | 4/2003 | Mutai et al. | 33/768 |
| 2014/0310969 | A1 | * | 10/2014 | Moreau et al. | 33/769 |

* cited by examiner

*Primary Examiner* — Yaritza Guadalupe-McCall
(74) *Attorney, Agent, or Firm* — Robert R. Deleault, Esq.; Mesmer & Deleault, PLLC

(57) ABSTRACT

A tape measure holder includes a holder body having a first side panel, a second side panel, a bottom panel, a first top portion, a second top portion, a forward-edge portion, a rearward-edge portion, a back end panel and a front strap. A securing mechanism has a first securing portion and a second securing portion connected to or integrally-formed with the first top portion and a second securing portion for interlocking the first top portion to the second top portion. The front strap extends between the forward-edge portion of the first side panel and the forward-edge portion of the second side panel and is positioned adjacent to but spaced a predefined distance from the bottom panel. The holder body is sized and configured to receive a tape measure in a snug manner with the first top portion overlapping the second top portion.

10 Claims, 5 Drawing Sheets

Figure 1 - *Prior Art*

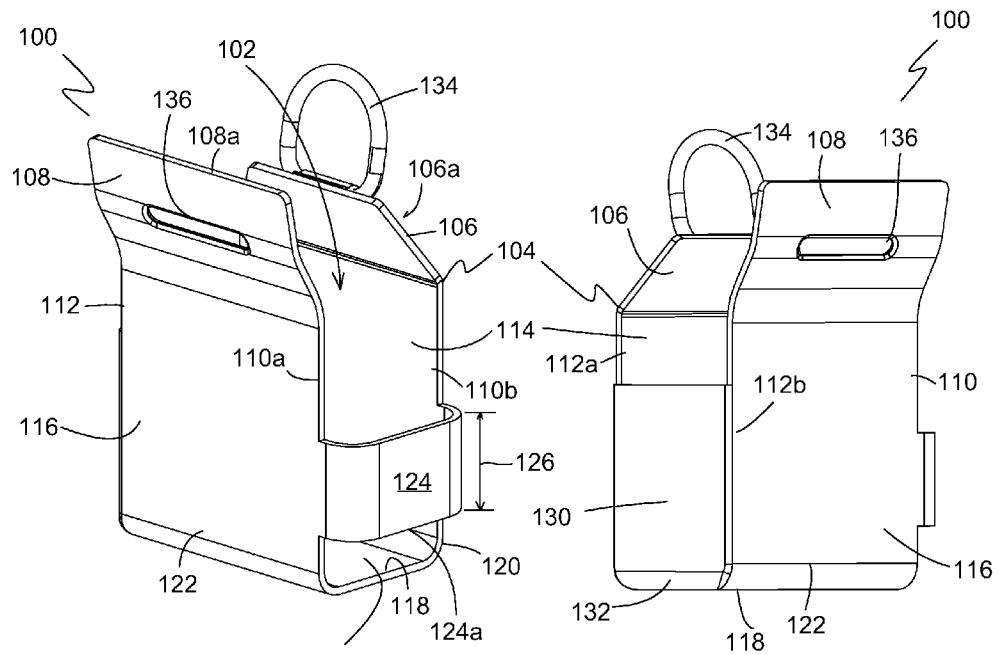
Figure 2
Figure 3
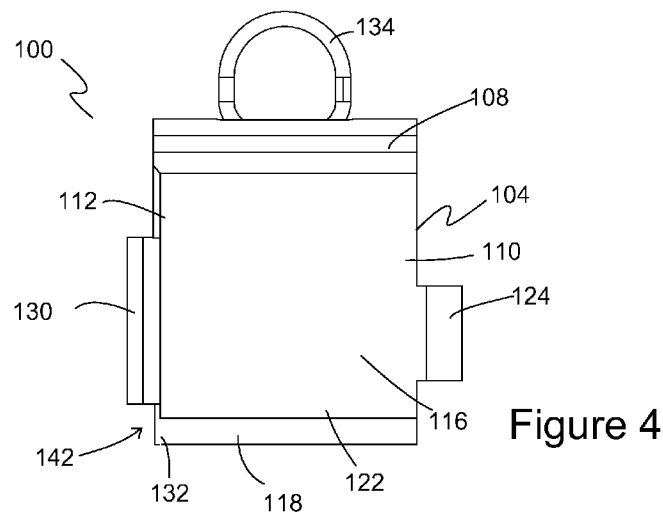
Figure 4

TAPE MEASURE HOLDER

This application is a continuation-in-part of U.S. patent application Ser. No. 29/452,484, filed on Apr. 17, 2013.

BACKGROUND OF THE INVENTION

1. Field of the Invention

The present invention relates generally to tool accessories and more particularly to a tape measure holder.

2. Description of the Prior Art

Carpenters, designers, facilities maintenance personnel, and other workers often use a tape measure on the job. FIG. 1 illustrates one embodiment of a tape measure 5 known in the art and having a housing 10 that contains a coiled tape 12. Housing 10 has a substantially planar first sidewall 14 and a substantially planar second sidewall 16 (not visible) spaced apart from and parallel to first sidewall 14. In many embodiments, a clip 18 is attached to first sidewall 14 of housing 10 and useful for attaching tape measure 5 to a belt or clothing. Extending between first sidewall 14 and second sidewall 16 are a front wall 20, a top wall, 22, a back wall 24 (not visible), and a bottom wall 26 (not visible). Bottom wall 26 is typically planar to facilitate the worker in setting tape measure 5 on a surface when taking a measurement. Front wall 20, top wall 22, and back wall 24 are substantially planar in some embodiments, but are curved in other embodiments. Tape measure 5 includes a lock 30 that is pressed to maintain tape 12 at a fixed length of extension from housing 10. Lock 30 may be a button, a sliding lock, or other type of lock. When lock 30 is a sliding lock, it moves between an unlocked position (shown) and a locked position (not shown) by sliding lock 30 along a slot 32 in housing 10 in a direction indicated by arrow 34 toward tape 12.

In addition to using the clip to attach the tape measure to a belt or the like, a worker may secure the tape measure between measurement tasks by placing it in a pocket or holder on a tool belt. One version of a tape measure holder is a relatively loose-fitting cloth pouch with a loop for attachment to a tool belt. The pouch has an open upper end for insertion and removal of the tape measure. The pouch is sized to accommodate the tape measure.

Another design that is more specific to the block shape of a tape measure is a holder having a horizontal strap that connects at each end to a belt and wraps around the tape measure in a horizontal direction. A second strap connects to the horizontal strap and wraps vertically around the bottom of the tape measure. In some designs, the vertical strap continues around the back and over the top of the tape measure with a loose end that closes on itself with a snap. The loose end of the vertical strap can be opened to release the tape measure and closed to retain the tape measure in the holder. In this design, the straps substantially enclose the entire tape measure. In some cases, lower corners of the tape measure holder are open to assist the user in pushing the tape measure up and out of the holder with the user's fingers.

In addition to holding a tape measure when it is not in use, there have been designs that attach a tether or lanyard to the tape measure. The lanyard has a loop sized to hook onto the tape measure's clip. Another approach has been to design the tape measure housing with an opening through which a string is attached and looped around the user's wrist.

SUMMARY OF THE INVENTION

Current designs for tape measure holders are useful for securing the tape measure when it is not being used. Existing tape measure holders concentrate on providing a location to store the tape measure, but require removal of the tape measure from the holder when used. Although a lanyard has been disclosed that attaches to the clip of a tape measure as one means to avoid tool drops, there are serious disadvantages to such a device. Because the lanyard is attached to the clip of the tape measure, the lanyard may easily be pulled through the open end of the clip. As a result, this approach does not provide a reliable retention system if the tape measure is dropped. Another disadvantage of attaching the lanyard to the tape measure's clip is that the clip is obstructed for attachment to a belt or clothing.

Tape measure housings that feature an opening useful for attaching a string also suffer disadvantages. The opening for the string is not sized to accept a clip or other lanyard connector. Strings supplied by the manufacturer and attached through the opening are often not used because the string is only long enough to loop around the worker's wrist. Strings supplied by the user must be tied in a knot to secure it to the tape measure. Additionally, workers who are accustomed to a particular make and model of tape measure may not be able to purchase the chosen tape measure equipped with an opening in the housing.

Current tape measure holders do not allow the worker to effectively use the tape measure when it is in the holder because the tape measure is held in one position near the user's waist. Also, the holder obstructs the tape and lock. Even when the corner of the holder is open to allow passage of the tape, the worker cannot use the lock because it is either covered completely or significantly obstructed by a strap or other portion of the holder that extends around the front of the tape measure. Therefore, a need exists for an improved tape measure holder that solves the problems described above.

It is an object of the present invention to provide a tape measure holder that maintains the functionality of the tape measure.

It is another object of the present invention to provide a tape measure holder that is configured for attachment to a lanyard.

The present invention achieves these and other objectives by providing a tape measure holder for use with a handheld tape measure. In one embodiment, a tape measure holder is disclosed in U.S. application Ser. No. 29/452,484 titled Tape Measure Holder, the contents of which are incorporated herein by reference in its entirety.

In another embodiment, the tape measure holder has a holder body with a first side panel, a second side panel, a bottom panel, a first top portion, a second top portion, a forward-edge portion, and a rearward-edge portion. In an open position, the holder body substantially defines a U-shape with the first side panel spaced apart from and substantially parallel to the second side panel, where the bottom panel extends between a bottom end portion of the first side panel and a bottom end portion of the second side panel. The first top portion and the second top portion have a securing mechanism. The securing mechanism has a first securing portion connected to or integrally-formed with the first top portion and a second securing portion connected to or integrally-formed with the second top portion where the first securing portion and the second securing portion are configured to interlock the first top portion and the second top portion together. The securing mechanism causes a mating engagement of first top portion and second top portion together to minimize the possibility of the top of the tape measure holder from opening. A back end panel extends between the rearward-edge portion of the first side panel and the rearward-edge portion of the second side panel. A front strap extends between the forward-edge portion of the first side panel and the forward-edge portion of the second side panel and is positioned adjacent to but spaced a predefined distance from the bottom panel. The strap is sized and configured to receive a tape measure in a snug manner with the first top portion overlapping the second top portion.

In another embodiment, the bottom panel is a stretchable material extending between and connecting the bottom end portion of the first side panel and the bottom end portion of the second side panel.

In another embodiment, the back end panel is made of a stretchable material.

In still another embodiment, the front strap is made of a stretchable material.

In another embodiment, the first securing portion of the securing mechanism is one of a lanyard ring and a lanyard ring slot. In a further embodiment, the first securing portion and the second securing portion of the securing mechanism is one of a hook and loop fastener, a button and button hole, a snap, a clip, a zipper, straps, and releasable adhesive coating.

In another embodiment, the first side panel includes a tape measure clip opening sized to permit passage therethrough of a clip connected to a first face of the tape measure when the tape measure is disposed in the tape measure holder. In a further embodiment, the clip opening is a slit in the first side panel. In another embodiment, the clip opening is a rectangular cutout that has an overall size greater than the overall size of the clip. Embodiments of the clip opening sized between these examples are also acceptable.

In another embodiment, the front strap is positioned to be between a tape opening and a lock of the tape measure when the tape measure is disposed in the tape measure holder.

In another embodiment, the front strap and/or the back end strap is adjustable.

In another embodiment, the front strap, the bottom panel, the forward-edge portion of the first side panel, and the forward-edge portion of the second side panel define a tape opening configured for passage therethrough of a tape of the tape measure. Similarly, the front strap, the forward-edge portion of the first side panel, the forward-edge portion of the second side panel, and the first end overlapping the second end define a lock opening sized to permit operation of a lock on the tape measure.

In another embodiment, a combination of a tape measure and holder is disclosed. The combination includes a tape measure and a tape measure holder. The tape measure holder a holder body with a first side panel, a second side panel, a bottom panel, a first top portion, a second top portion, a first side panel, a second side panel, a bottom panel, a forward-edge portion, and a rearward-edge portion. In an open position, the holder body substantially defines a U-shape with the first side panel spaced apart from and substantially parallel to the second side panel, where the bottom panel extends between a bottom end portion of the first side panel and a bottom end portion of the second side panel. The first top portion and the second top portion have a securing mechanism. The securing mechanism has a first securing portion connected to or integrally-formed with the first top portion and a second securing portion connected to or integrally-formed with the second top portion where the first securing portion and the second securing portion are configured to interlock the first top portion to the second top portion. A back end panel extends between the rearward-edge portion of the first side panel and the rearward-edge portion of the second side panel. A front strap extends between the forward-edge portion of the first side panel and the forward-edge portion of the second side panel and positioned adjacent to but spaced a predefined distance from the bottom panel. The strap is sized and configured to receive a tape measure in a snug manner with the first top portion overlapping the second top portion.

The advantages of the present invention over the prior art is the ability to use all of the features of a handheld tape measure while the tape measure is in the tape measure holder. These features include, but are not limited to, one or more of extending and retracting the tape during use, locking the tape when the tape is in an extended position, attaching the clip of the tape measure to a belt or other holding strap where such holding strap is rigid or flexible.

Many other uses and configurations of the tape measure holder are contemplated within the scope of the present invention.

BRIEF DESCRIPTION OF THE DRAWINGS

FIG. 2 is a right, front perspective view of one embodiment of a tape measure holder of the present invention shown in an open position and including a lanyard ring.

FIG. 3 is a right, rear perspective view of the tape measure holder of FIG. 2.

FIG. 4 is a right, side view of the tape measure holder of FIG. 2.

DETAILED DESCRIPTION OF THE PREFERRED EMBODIMENT

Figure 1:
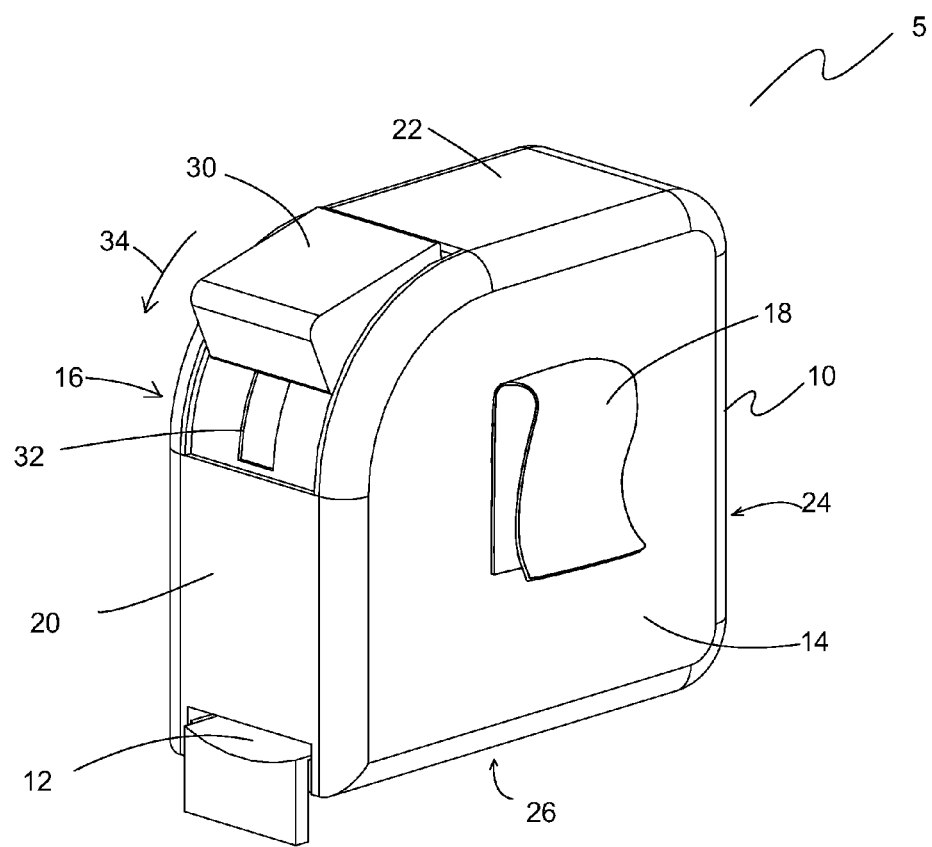
FIG. 1 is a perspective view of one embodiment of a tape measure known in the art.

The preferred embodiments of the present invention are illustrated in FIGS. 2-9. FIGS. 2 and 3 illustrate a front perspective view and a rear perspective view, respectively, of one embodiment of a holder 100 for a tape measure. Holder 100 has a holder body 104 with a first top portion 106, a second top portion 108, a first side panel 114, a second side panel 116, and a bottom panel 118. First top portion 106 and second top portion 108 together forming a top closure for tape measure holder 100 and are shown in FIGS. 2 and 3 in an open position. First top portion 106 has an optional lanyard ring 134 affixed to an outside surface 106a of first top portion 106. Second top portion 108 includes an optional lanyard ring slot 136. Lanyard ring slot 136 extends completely through second top portion 108 and is spaced from end portion edge 108a a predefined distance such that when assembled to first top portion 106, lanyard ring 134 extends through lanyard ring slot 136 and is preferably centered over the top of the tape measure. The position of lanyard ring 134 through lanyard ring slot 136 provides an interlocking arrangement that minimizes the possibility of second top portion 108 separating from first top portion 106. Lanyard ring 134 and lanyard ring slot 136 are considered one embodiment of a securing mechanism for first and second top portions 106, 108 and are discussed in more detail below.

Holder body 104 also has a forward-edge portion 110 and a rearward-edge portion 112. In its open position, holder body 104 substantially defines a U-shaped housing with first side panel 114 spaced apart from, opposite, and substantially parallel to second side panel 116. Bottom panel 118 extends between and connects a bottom end portion 120 of first side panel 114 and a bottom end portion 122 of second side panel 116. Holder 100 defines a receptacle with a space 102 sized to receive a tape measure.

Holder body 104 is preferably made of a pliant material, such as leather, woven or non-woven fabrics, plastic, or other natural or synthetic materials, including stretchable materials. Holder body 104 may also be made of rigid or semi-rigid materials, such as plastic and metal. In one embodiment, holder body 104 is a unitary, continuous member and includes first side panel 112 with first top portion 106, bottom panel 118, and second side panel 116 with second top portion 108. In other embodiments, a plurality of separate members (e.g., first side panel 114, bottom panel 118, and second side panel 116) are stitched together or otherwise joined to define holder body 104.

In one embodiment, each of first side panel 114 and second side panel 116 are substantially square or rectangular in shape. Other shapes are acceptable, such as a rounded shape chosen to fit the shape of a rounded tape measure housing.

A front strap 124 extends between and connects forward edge portion 110a of first side panel 114 and forward edge portion 110b of second side panel 116. Front strap 124, first side panel 114, second side panel 116, and bottom panel 118 define a tape opening 128 that is sized and positioned to allow extension of tape 12 therethrough. Front strap 124 is preferably positioned to be between tape 12 and a lock 30 of various embodiments of tape measure 5 (shown in FIG. 1). In one embodiment, this positioning is accomplished by placing bottom margin 124a of front strap 124 about ⅜" to ½" above bottom panel 118. In one embodiment, width 126 of front strap 124 is about one-half inch (½") to fully allow lock 30 (e.g., a sliding lock) to be operated without interference from front strap 124.

Referring to FIG. 3, a back end panel 130 extends between and connects rearward edge portion 112a of first side panel 114 and rearward edge portion 112b of second side panel 116. In one embodiment, back end panel 130 is stitched or otherwise fixedly attached to both of first side panel 114 and second side panel 116. In other embodiments, back end panel 130 is fixedly attached to only one side panel (e.g., first side panel 114) and releasably connects to the other side panel (e.g., second side panel 116) using a fastener (e.g., snap(s), hook-and-loop fastener, clip(s), etc.). Such a configuration with hook-and-loop fasteners allows the user to tighten back end panel 130 as desired against back wall 24 of tape measure 5 (shown in FIG. 1).

In another embodiment, front strap 124 and/or back end panel 130 is made of or includes a stretchable material, such as elastic, Spandex™, Lycra®, natural latex, or the like. Making front strap 124 and back end panel 130 of a stretchable material allows tape measure holder 100 to be usable for various sizes of tape measure since front strap 124 and back end panel 130 may stretch to accommodate wider tape measures. In other words, tape measure holder 100 is made to accommodate tape measures of different manufacturers and sizes. In one embodiment, back end panel 130 and bottom panel 118 are connected at a corner region 132. In another embodiment, back end panel 130 and bottom panel 118 are continuous. In other embodiments, back end panel 130 and bottom panel 118 are separate panels that may or may not overlap at corner region 132 and optionally define a corner opening 142 (shown in FIG. 4) at corner region 132. It is also contemplated that any portion of tape measure holder 100 or all of the tape measure holder 100 may be made of a stretchable material.

Referring now to FIG. 4, a side view illustrates holder 100 with holder body 104 in a closed position, where second top portion 108 wraps over the top of holder 100 to connect to first top portion 106 and/or first side panel 114 (not visible). Second side panel 116 preferably connects at bottom end portion 122 to bottom panel 118. Front strap 124 connects to forward edge portion 110 of holder body 104. Front strap 124 is preferably sized in this embodiment to allow front wall 20 of tape measure 5 (shown in FIG. 8) to protrude beyond front edge portion 110 of holder body 104. One advantage of allowing tape measure 5 to protrude beyond front edge portion 110 is to facilitate access to tape 12 and lock 30 of tape measure 5. Back end panel 130 connects to rearward edge portion 112 of holder body 104 and is preferably sized to allow back wall 24 (shown in FIG. 7) to protrude beyond rearward edge portion 112. As shown, bottom panel 118 is not continuous with back end panel 130, thereby defining a corner opening 142 at corner region 132. Thus, as an alternate method of tethering holder 100, the user may loop a tether around back end panel 130 rather than connecting the tether to lanyard ring 134.

Figure 5:
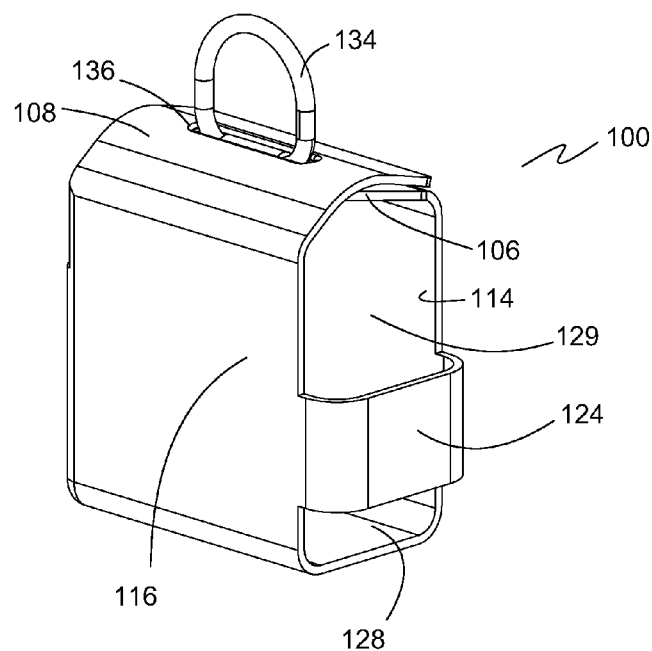
FIG. 5 is a right, front perspective view of the tape measure holder of FIG. 2 shown in a closed position.

Referring now to FIG. 5, a right, front perspective view illustrates holder 100 shown with second top portion 108 overlapping first top portion 106 in a closed position. Lanyard ring 134 is secured to first top portion 106 and passes through lanyard ring slot 136 in second top portion 108 when end portions 106, 108 overlap. In another embodiment, lanyard ring 134 is connected to second top portion 108 or to other portions of holder 100. First side panel 114, second side panel 116, front strap 124, and one or both end portions 106, 108 define a lock opening 129 sized and configured to permit access to a lock 30 on various embodiments of tape measure 5.

Figure 6:
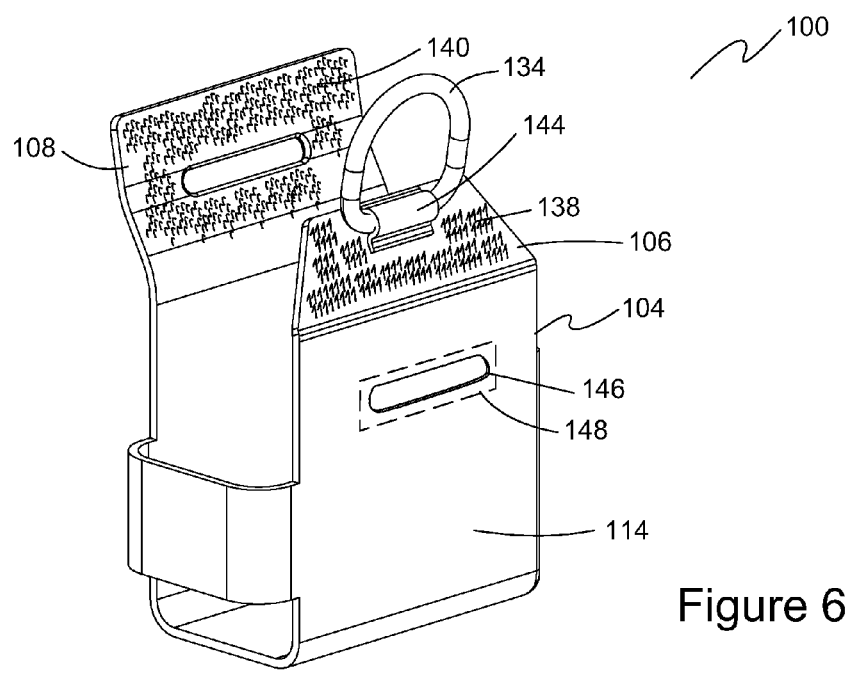
FIG. 6 is a left, front perspective view of the tape measure holder of FIG. 2 showing hook and loop fastener portions on the end/top portions of the tape measure holder and a clip opening in a side panel.

Referring now to FIG. 6, a left, front perspective view illustrates holder 100 with first top portion 106 and second top portion 108 in an open position. Lanyard ring 134 is secured to first top portion 106 with a lanyard ring strap 144 stitched or otherwise attached to first top portion 106. In one embodiment, lanyard ring strap 144 is a length of nylon or cloth. In other embodiments, lanyard ring strap 144 is made of metal and riveted or otherwise secured to first top portion 106. In a preferred embodiment, lanyard ring 134 is capable of rotating over a predefined arc about lanyard ring strap 144.

In one embodiment, first top portion 106 and second top portion 108 have an alternate securing mechanism from the securing mechanism of lanyard ring 134 and lanyard ring slot 136. In an alternate securing mechanism, a first fastener portion 138 and a second fastener portion 140 are attached to or disposed on first top portion 106 and second top portion 108, respectively, to maintain holder body 104 in a closed position. First and second fastener portions 136, 138 may be mating portions of a hook-and-loop fastener (e.g., Velcro®), snaps, clips, button and hole combination, and the like. Other fasteners and/or a releasable adhesive are also acceptable to secure together overlapping end portions 106, 108.

Holder 100 shown in FIG. 6 has an optional clip opening 146 through first side panel 114. Clip opening 146 is a slit, a cutout, or other opening that is sized and positioned to permit a tape measure's clip 18 (shown in FIG. 1) to pass through or be accessed. In one embodiment, clip opening 146 is a slit that is reinforced with stitching 148.

Figure 7:
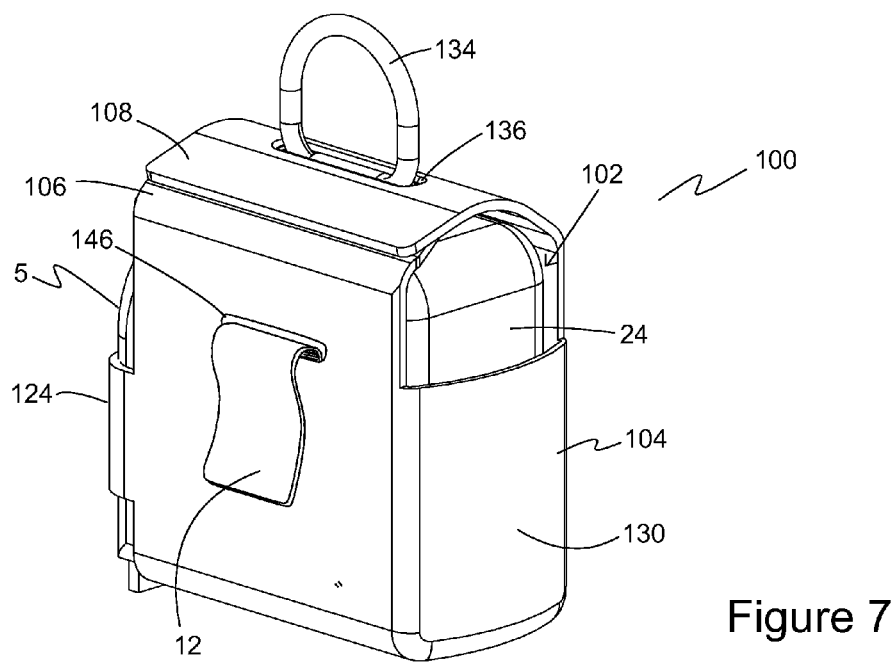
FIG. 7 is a left, rear perspective view of the tape measure holder of FIG. 2 shown with a tape measure disposed in the holder.
Figure 8:
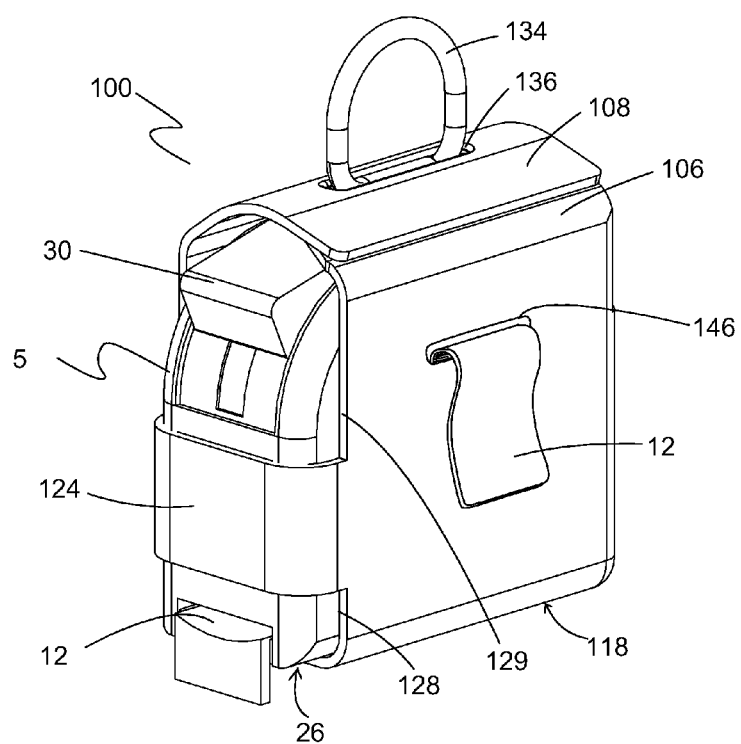
FIG. 8 is a left, front perspective view of the tape measure holder of FIG. 2 shown with a tape measure disposed in the holder.

Referring now to FIGS. 7 and 8, holder 100 is shown with tape measure 5 in rear and front perspective views, respectively. Holder 100 is used to retain tape measure 5 and provide a point of attachment for a tether or lanyard. In this embodiment, a lanyard may be attached to lanyard ring 134. Tape measure 5 is placed into open space 102 defined by holder 100 with front wall 20 against front strap 124, back wall 24 against back end panel 130, and bottom wall 26 (not visible) against bottom panel 118. When tape measure 5 includes clip 18, clip 18 is passed through or aligned with clip opening 146 as tape measure 5 is inserted into holder 100. First top portion 106 is then positioned over top surface 22 of tape measure 5 and second top portion 108 is positioned to overlap first top portion 106. Holder body 104, rearward end panel 130, and forward strap 124 are sized and configured to retain tape measure 5 in holder 100. When holder 100 has lanyard ring 134 and lanyard ring slot 136, lanyard ring is positioned to extend through lanyard ring slot 136. To prevent accidental drops on the jobsite, a lanyard or tether is preferably clipped to lanyard ring 134, but alternately may be looped through openings in holder 100 (e.g., looped around back end panel 130). Tape 12 extends through tape opening 128 and lock 30 is accessible and can be operated through lock opening 129. It is also contemplated in those embodiments where an alternate securing mechanism is provided to interlock first and second top portions 106, 108 together, the lanyard ring may be attached to the outer surface of holder body 104 is any other location, even to the outer surface of second top portion 108 that overlaps first top portion 106.

Figure 9:
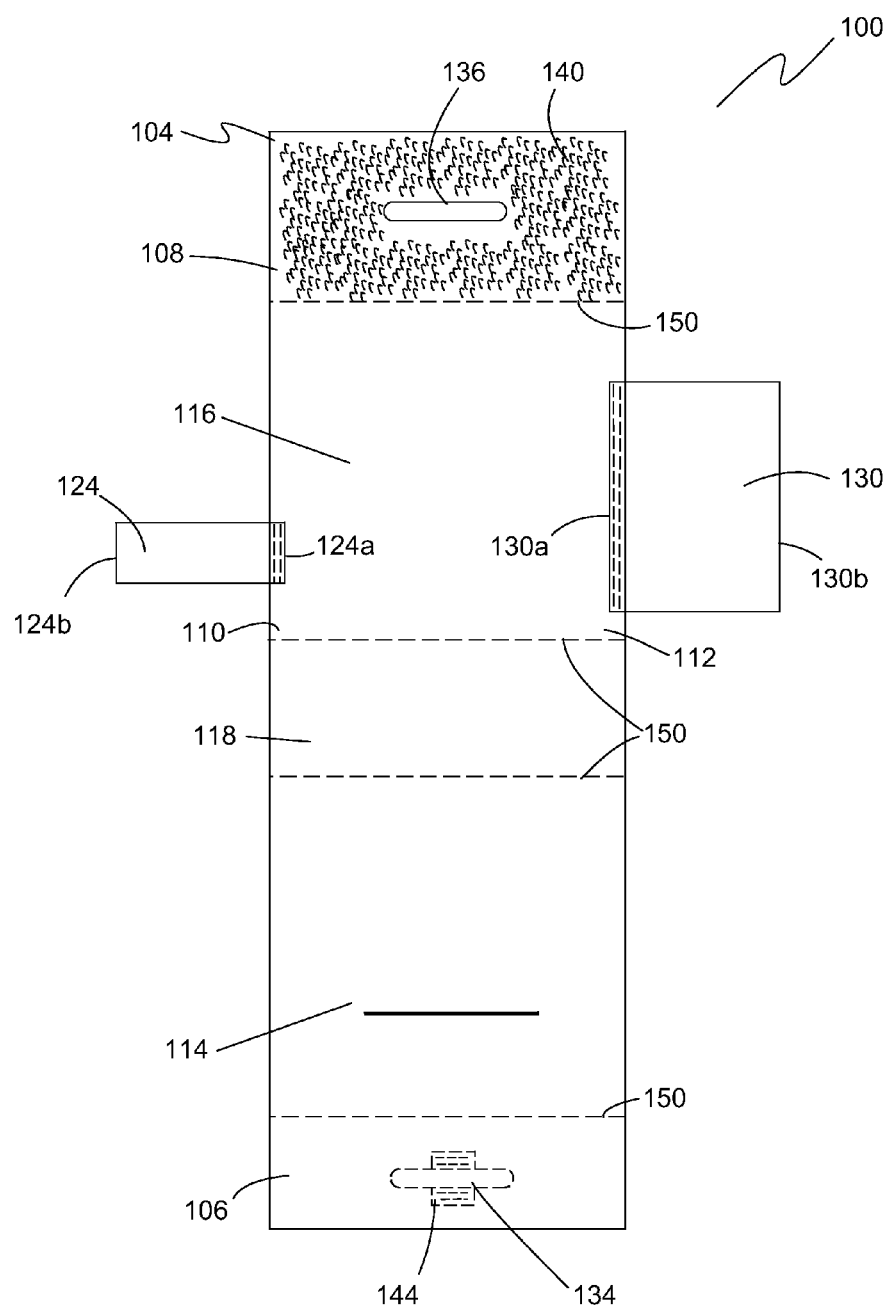
FIG. 9 is a plan view of a holder body, a front strap, and a back end panel of tape measure holder of the present invention shown partially assembled.

Referring now to FIG. 9, a partially-assembled embodiment of holder 100 is illustrated showing an inside surface 101. Holder body 104 is laid out flat and includes first top portion 106, first side panel 114, bottom panel 118, second side panel 116, and second top portion 108. As noted above, holder body 104 may be made of one piece of material and folded, or may be made from a plurality of sections that are stitched or fastened together. Broken lines 150 indicate the approximate location of seams or folds between portions of holder body 104. In one embodiment, second fastener portion 140 is a sheet of hook-and-loop fastener that is adhered and/or stitched to second top portion 108 of holder body 104. First fastener portion 138 (not visible in FIG. 7) is similarly secured to outside surface 106a (not shown/hidden from view) of holder body 104 at first top portion 106. Front strap 124 and back end panel 130 are preferably stitched along forward edge portion 110 and rearward edge portion 112, respectively.

To assemble holder 100 where holder body 104 is a single, substantially rectangular piece of material, front strap 124 and back end panel 130 are fixedly attached on one end (124a, 130a) to first side panel 114 and second side panel 116 in substantially the position shown in FIG. 9. Holder body 104 is folded in a U-shape with first side panel 114 spaced apart from second side panel 116. Loose end 124b of front strap 124 is stitched or otherwise secured to front end portion 110 at first side panel 114. Similarly, loose end 130b of back end panel 130 is then stitched or otherwise secured to rearward end portion 112 of holder body 104 at first side panel 114. Of course, front strap 124 and back end panel 130 may optionally be secured first to first side panel 114 and then to second side panel 116. In another embodiment, front strap 124 and back end panel 130 are unitary and continuous with holder body 104 (i.e., cut or formed in one piece from a single piece of material), where only loose ends 124b, 130b, respectively, need to be secured. In one embodiment, loose ends 124b, 130b attach to first side panel 114 (and/or to second side panel 116) using a fastener (e.g., snaps, hook-and-loop fastener, clips, etc.). When optional lanyard ring 134 is used, it is preferably secured to holder body 104 by stitching lanyard ring strap 144 at both ends to holder body 104 after looping it through lanyard ring 134. In a further embodiment, each of first side panel 114, second side panel 116, bottom 118, front strap 124, and back end panel 130 are individual pieces requiring attachment to each other along their respective edges as shown.

In one embodiment, holder 100 is made of one or more fabrics, such as woven nylon and/or elastic. In other embodiments, holder is made of leather, vinyl, plastic, or other pliant or rigid materials. Lanyard ring 134 is preferably a D-ring made of steel.

Although holder 100 is illustrated in the figures discussed above as having first top portion 106 extending from first side panel 114 and second top portion 108 extending from second side panel 116, one end portion (e.g., second top portion 108) may not extend from the side panel (e.g., second side panel 116), but instead terminates at approximately the top surface 22 of tape measure housing 10. The other end portion (e.g., first top portion 106) would then be sized to extend over top surface 22 of tape measure to overlap second top portion 108 and attach to second side panel 116.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

We claim:

1. A tape measure holder comprising:
   a holder body having a first side panel with a first upper end portion, a second side panel with a second upper end portion, a bottom panel, a first top portion extending from the first upper end portion, a second top portion extending from the second upper end portion and defining a lanyard slot therethrough, a forward-edge portion and a rearward-edge portion, the holder body defining a U-shape with the first side panel spaced apart from and substantially parallel to the second side panel, and the bottom panel extending between a bottom end portion of the first side panel and a bottom end portion of the second side panel;
   a lanyard ring connected to or integrally-formed with the first top portion and positioned on the first top portion for insertion into the lanyard slot of the second top portion;
   a back end panel extending between the rearward-edge portion of the first side panel and the rearward-edge portion of the second side panel; and
   a front strap extending between the forward-edge portion of the first side panel and the forward-edge portion of the second side panel and positioned adjacent to but spaced a predefined distance from the bottom panel;
   wherein the holder body is sized and configured to receive a tape measure in a snug manner with the first top portion overlapping the second top portion; and
   wherein the second top portion is sized and configured to wrap over a top of the tape measure and overlap the first top portion with the lanyard ring extending through the lanyard slot in the second to portion to interlock the first to portion to the second top portion and enable connection to a lanyard.

2. The tape measure holder of claim 1, wherein the bottom panel is an elastic material connected to and extending between the bottom end portion of the first side panel and the bottom end portion of the second side panel.

3. The tape measure holder of claim 1, wherein the back end panel is made of an elastic material.

4. The tape measure holder of claim 1 further comprising a securing mechanism having a first securing portion connected to or integrally-formed with the first to portion and a second securing portion connected to or integrally-formed with the second to portion, wherein the first securing portion and the second securing portion are configured to interlock the first top portion to the second top portion, and wherein the securing mechanism is one of a hook and loop fastener, a button and button hole, a snap, a clip, a zipper, straps, and a releasable adhesive coating.

5. The tape measure holder of claim 1, wherein the first side panel includes a tape measure clip opening sized to permit passage therethrough of a clip connected to a first face of the tape measure when the tape measure is disposed in the tape measure holder.

6. The tape measure holder of claim 5, wherein the clip opening is a slit in the first side panel.

7. The tape measure holder of claim 1, wherein the front strap defines a lower front opening and an upper front opening that is larger than the lower front opening.

8. The tape measure holder of claim 1, wherein the front strap is adjustable.

9. The tape measure holder of claim 1, wherein
the front strap, the bottom panel, the forward-edge portion of the first side panel, and the forward-edge portion of the second side panel define a tape opening configured for passage therethrough of a tape of the tape measure; and
wherein the front strap, the forward-edge portion of the first side panel, the forward-edge portion of the second side panel, and the first end overlapping the second end define a lock opening sized to permit operation of a lock on the tape measure.

10. A tape measure and holder combination, the combination comprising:
a tape measure; and
a tape measure holder comprising:
a holder body having a first side panel with a first upper end portion, a second side panel with a second upper end portion, a bottom panel, a first top portion extending from the first upper end portion, a second top portion extending from the second upper end portion and defining a lanyard slot therethrough, a forward-edge portion and a rearward-edge portion, the holder body defining a U-shape with the first side panel spaced apart from and substantially parallel to the second side panel, and the bottom panel extending between a bottom end portion of the first side panel and a bottom end portion of the second side panel;
a lanyard ring connected to or integrally-formed with the first top portion and positioned on the first to portion for insertion into the lanyard slot of the second to portion;
a back end panel extending between the rearward-edge portion of the first side panel and the rearward-edge portion of the second side panel; and
a front strap extending between the forward-edge portion of the first side panel and the forward-edge portion of the second side panel and positioned adjacent to but spaced a predefined distance from the bottom panel;
wherein the holder body is sized and configured to receive a tape measure in a snug manner with the first top portion overlapping the second top portion; and
wherein the second top portion is sized and configured to wrap over a top of the tape measure and overlap the first top portion with the lanyard ring extending through the lanyard slot in the second to portion to interlock the first top portion to the second top portion and enable connection to a lanyard.

* * * * *